United States Patent [19]
Bonnar et al.

[11] Patent Number: 6,145,425
[45] Date of Patent: Nov. 14, 2000

[54] PUNCH ACTIVATING APPARATUS

[76] Inventors: William R. Bonnar; Karan Bonnar, both of 1418 Milan Ct., Livermore, Calif. 94550

[21] Appl. No.: 09/211,415

[22] Filed: Dec. 15, 1998

[51] Int. Cl.[7] .................. B26D 5/10; B26F 1/02
[52] U.S. Cl. .................. 83/522.15; 83/522.26; 83/633; 83/684; 100/293
[58] Field of Search .................. 83/588, 605, 606, 83/613, 627, 633, 634, 684, 685, 686, 690, 698.91, 532, 559, 560, 522.15, 522.16, 522.18, 522.26; 100/293

[56] References Cited

U.S. PATENT DOCUMENTS

| | | | |
|---|---|---|---|
| 173,732 | 2/1876 | Matthews | 83/605 |
| D. 377,804 | 2/1997 | Beijen | D18/34 |
| 475,549 | 5/1892 | Firnstein | 83/146 |
| 685,212 | 10/1901 | Knowlton | 83/597 |
| 847,167 | 3/1907 | Derry | 83/548 |
| 909,739 | 1/1909 | Barrett | 83/633 X |
| 1,491,464 | 4/1924 | Coomer | 83/637 |
| 1,728,475 | 9/1929 | Cavill | 83/633 X |
| 2,131,359 | 9/1938 | Seffzig | 83/33 |
| 2,227,575 | 1/1941 | Eliel et al. | 83/439 |
| 2,653,663 | 9/1953 | Maxant | 83/527 |
| 2,695,062 | 11/1954 | Taylor | 83/588 X |
| 3,250,166 | 5/1966 | Stewart | 83/633 X |
| 3,385,152 | 5/1968 | Brown et al. | 83/633 |
| 5,172,622 | 12/1992 | Sabin | 83/520 |
| 5,255,587 | 10/1993 | Eichenberg et al. | 83/628 |
| 5,333,352 | 8/1994 | McDonald, Jr. | 100/293 X |
| 5,601,006 | 2/1997 | Quinn et al. | 83/588 |
| 5,749,278 | 5/1998 | Lee et al. | 83/588 |
| 5,778,748 | 7/1998 | Beijen | 83/529 |

*Primary Examiner*—Clark F. Dexter
*Attorney, Agent, or Firm*—Finley & Berg, L.L.P.

[57] ABSTRACT

A punch activating apparatus is provided which may be used in connection with a plurality of button-activated punches having different shapes and sizes. The punch activating apparatus comprises a base assembly including a base having an upper surface, and a lever assembly secured to the base assembly. The upper surface of the base defines a target area, and the lever assembly is operable to engage and depress the activating button of any one of the plurality of punches when the punch is positioned at the target area.

9 Claims, 5 Drawing Sheets

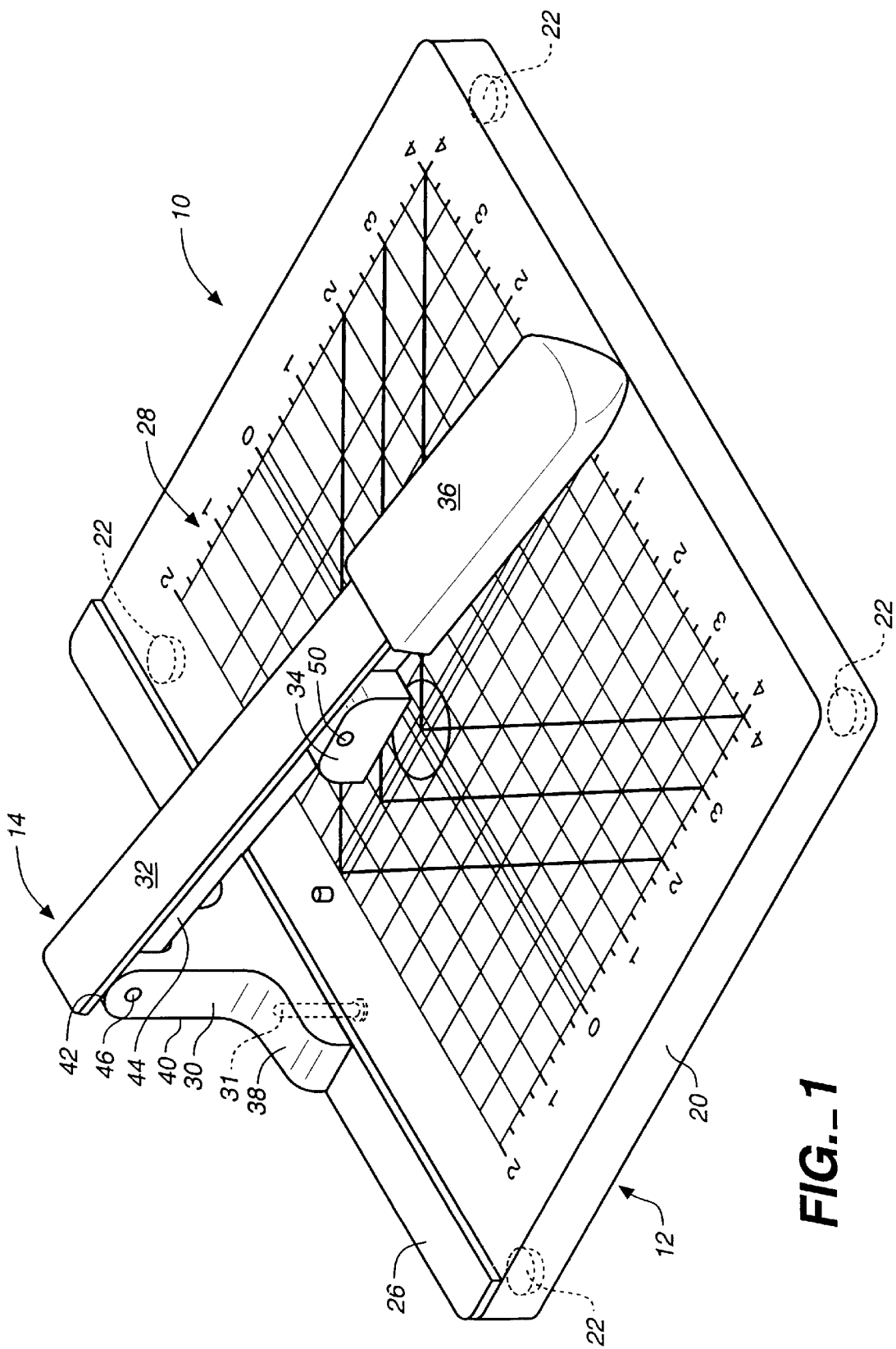
FIG._1

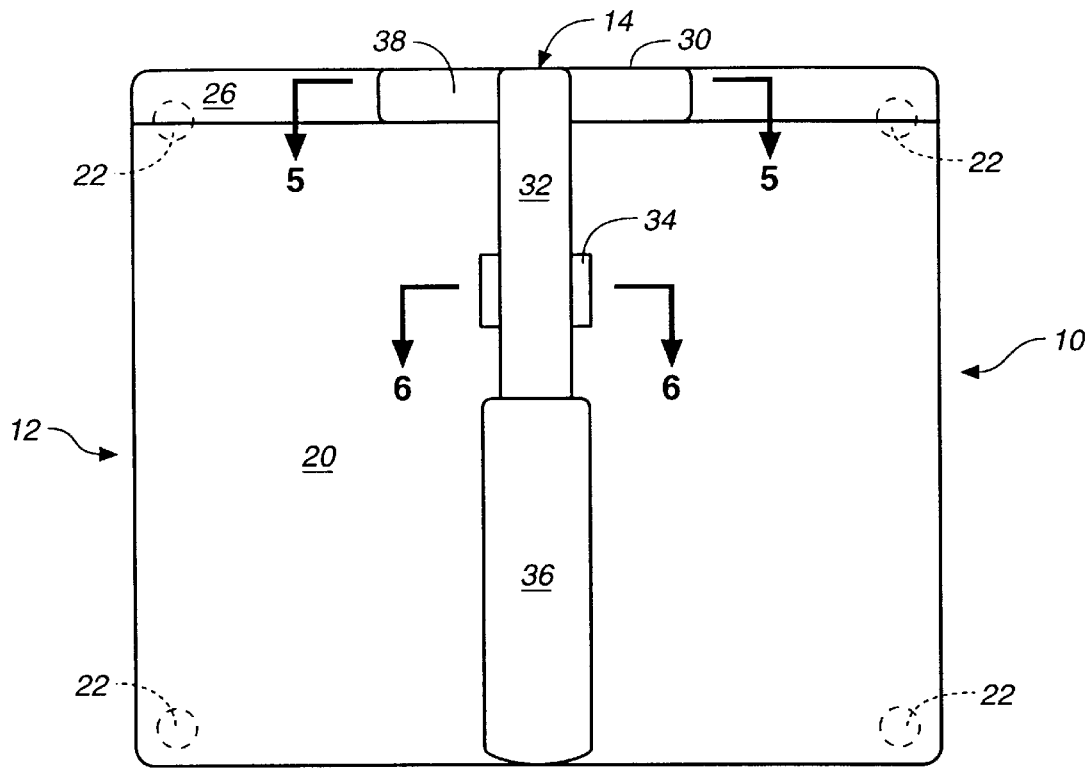
FIG._2
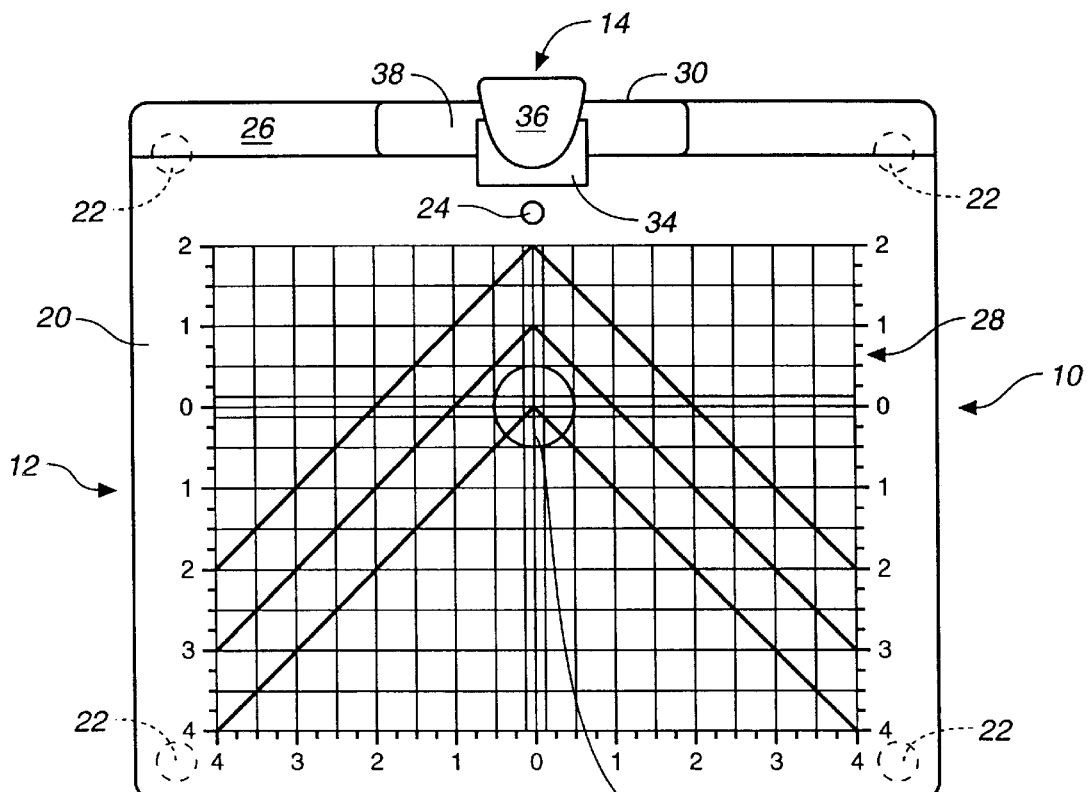
FIG._3

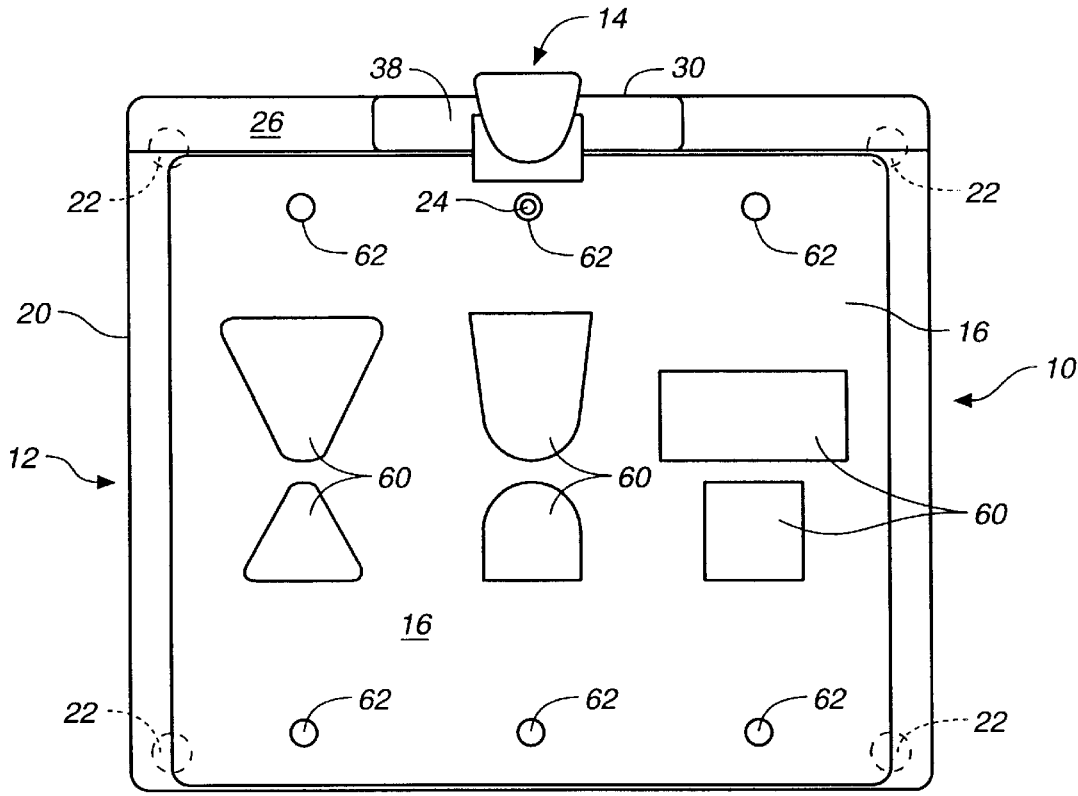
FIG._4
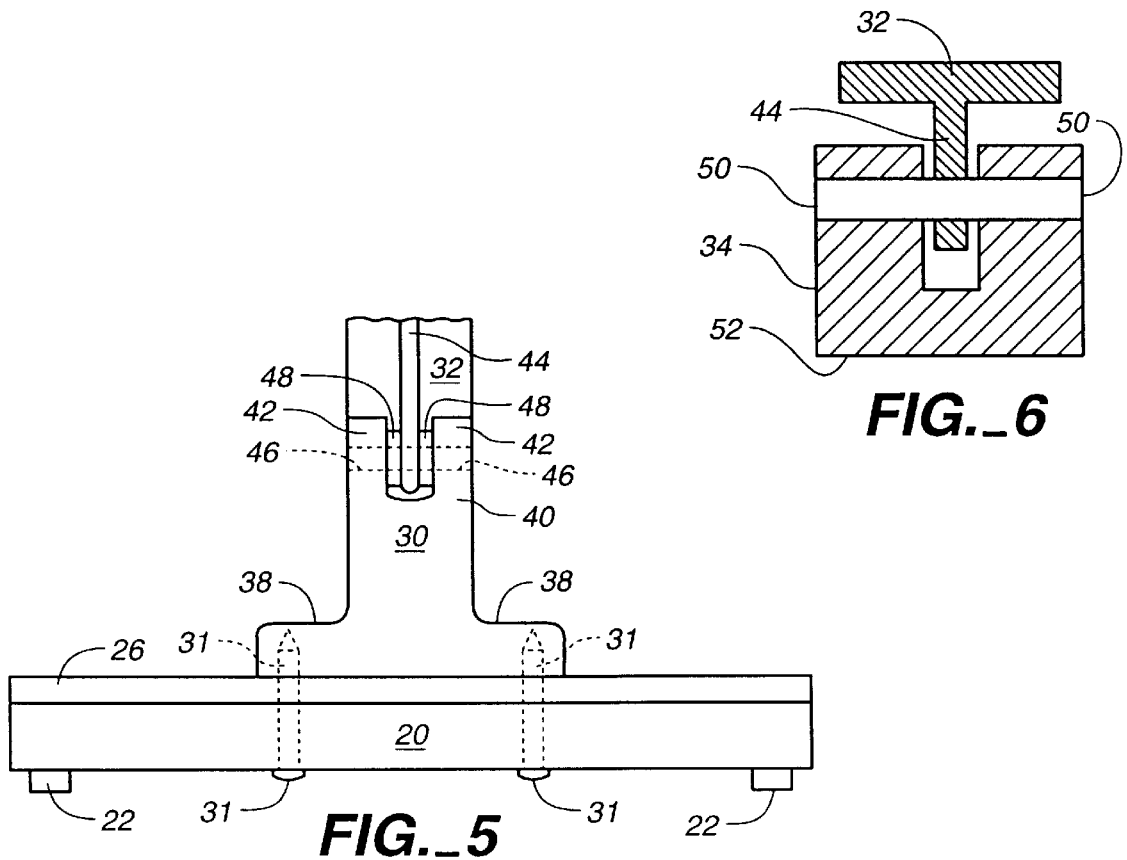
FIG._6
FIG._5

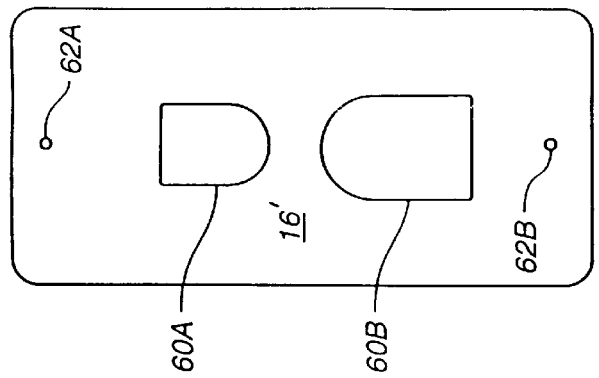
FIG._7A
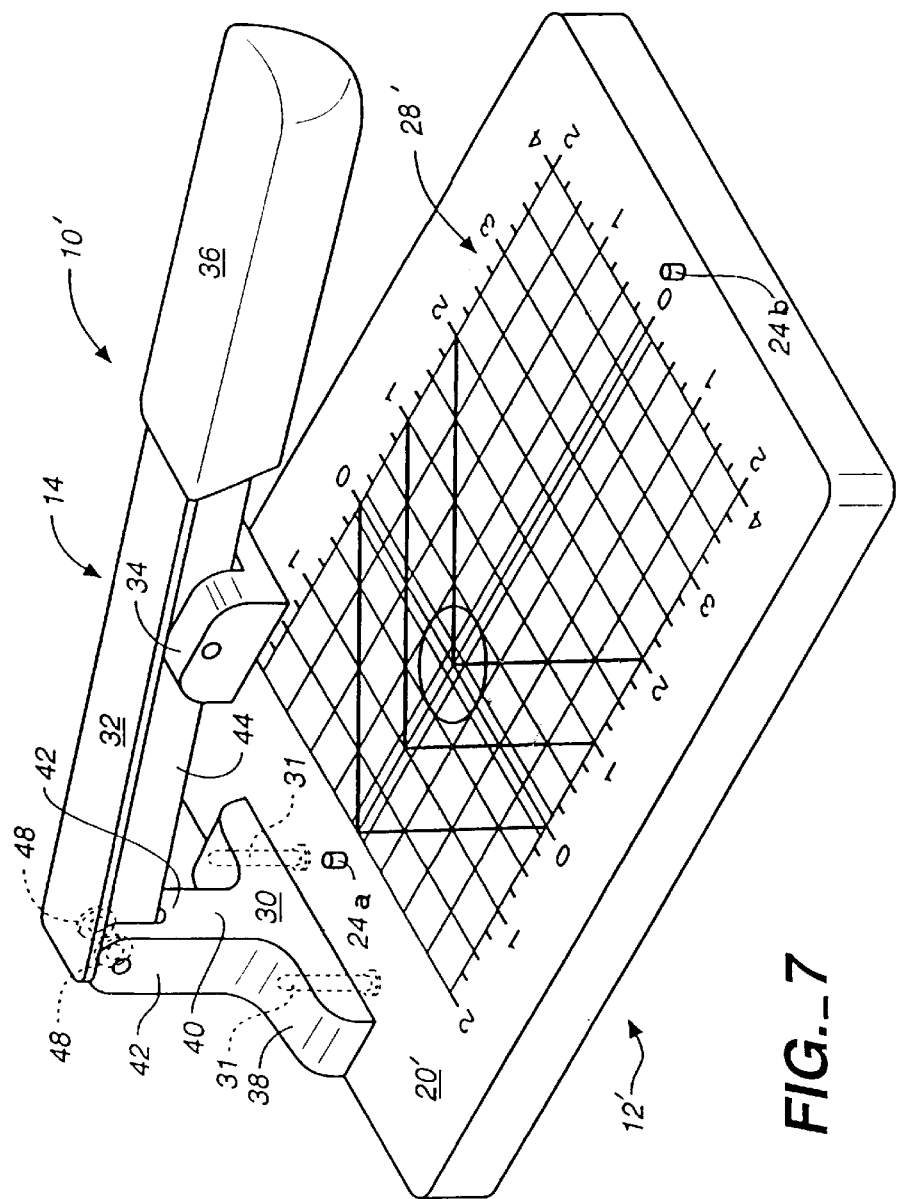
FIG._7

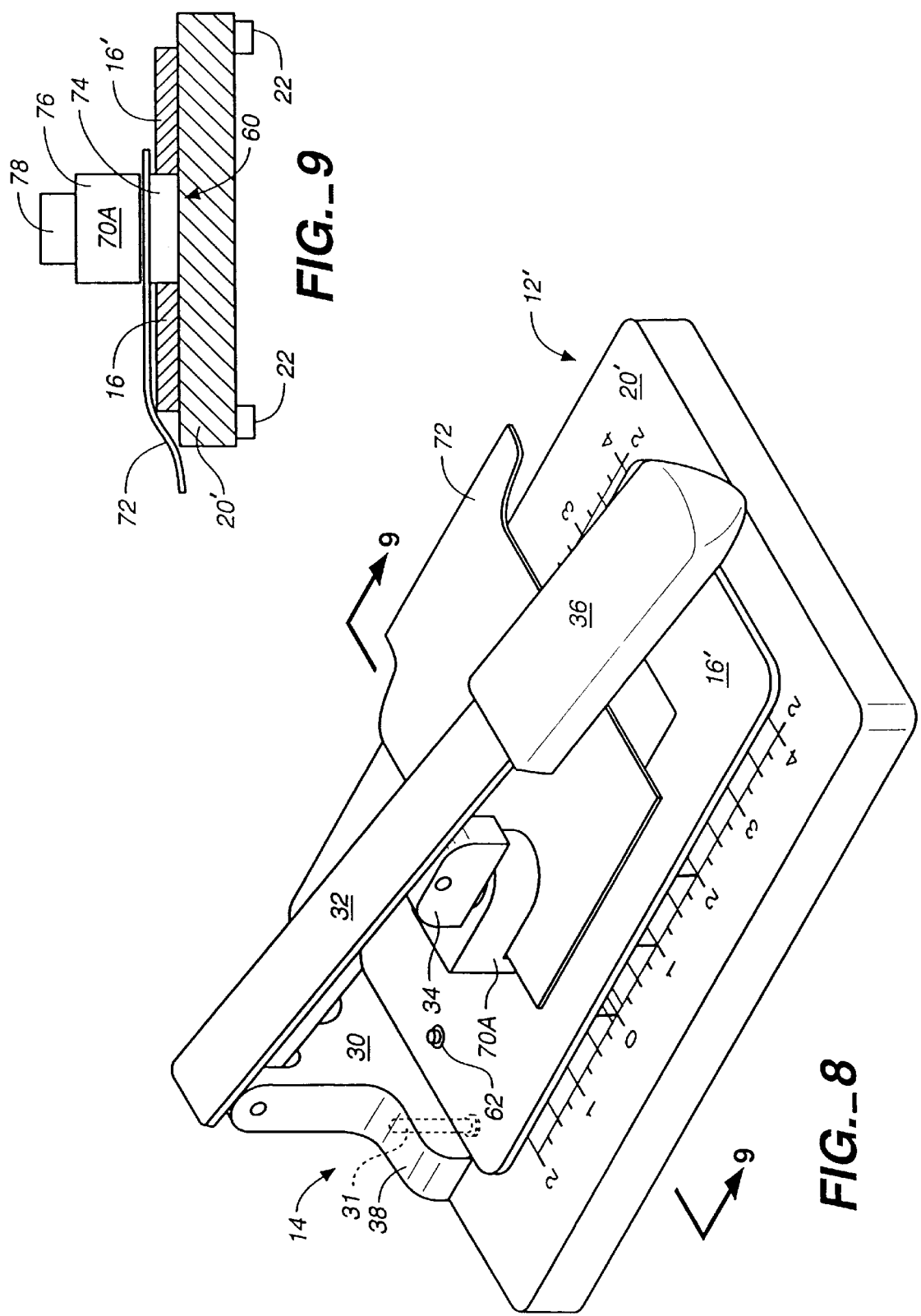

PUNCH ACTIVATING APPARATUS

FIELD OF THE INVENTION

This invention generally relates to a device used to align a punch to a sheet to be cut and to activate the punch using indirect force.

BACKGROUND OF THE INVENTION

Craft punches are popular devices which can be used to create decorative cutouts for projects such as scrapbooks. The vast majority of craft punches work in the same way: the user inserts a sheet of material (typically paper) into a horizontally aligned slot at the base of the punch, and then exerts downward pressure on a button at the top of the punch. The punch is configured such that when the button is fully compressed, a die forming a cutting edge with the desired contour for the cutout is forced through the paper. The punch cuts a hole of the desired contour into the sheet and produces a cutout from the sheet material having the desired contour.

The alignment of the sheet within the craft punch becomes particularly important in applications where the desired end product is the punched sheet rather than the cutouts. Given the significant time spent creating punched sheets, it is critical that misalignment of the sheet not occur on any punch, and particularly on punches occurring near the end of a project, which results in having to start the project afresh. Even where the production of a stack of cutouts is the end goal, proper sheet alignment maximizes the number of cutouts which can be produced from each sheet. While some craft punches are sized or may include structures to assist in punching particular parts of the sheet, the user is otherwise typically left to his or her own devices to properly align the sheet within the punch.

Punches of different sizes and shapes are available to accommodate particular designs. Basic cutout punches, which are primarily used to produce cutouts rather than to punch holes in a particular portion of the sheet of paper fed into the punch, may be shaped in any fashion, and typically are sized to be just larger than the cutout. Corner punches are designed to cut the corner of a sheet to a particular pattern, and are sized to fit the insertion of a corner of a sheet. Border punches, which are primarily used to create holes of a desired shape along the edge of a sheet of paper, usually have shallow slots, so that the sheet will not be pushed far into the punch and the holes will be punched closely along the sheet's edge. Border punches are frequently elongated so that an extended pattern may be formed along the border of the sheet.

The bulk of craft punches are commercially available as independent units and may be purchased and used singly. For example, punches are produced by companies including Uchida of America Corporation of Torrance, Calif.; Fiskars Incorporated of Madison, Wis.; STAMPIN' UP! of Kanab, Southern Utah; and Family Treasures of Valencia, Calif. Thus, users can amass a library of punches for desired designs by purchasing from a variety of manufacturers. Accordingly, punch users avoid compatibility issues which exist with more traditional cutting apparatus such as die cutters, which typically are adaptable to cutting different patterns, but which must use dies of a particular size and/or shape.

For example, the die cutters in U.S. Pat. No. 5,255,587 to Eichenburg et al. and U.S. Pat. No. 5,778,748 to Beijen use interchangeable dies, so that by replacing the die used within the die cutter, different patterns may be cut from a sheet. However, the die elements used in the Eichenburg patent must fit within a rectangular receiver element, and must be shaped in the form of a rectangular block of a roughly fixed shape and size. Similarly, the die elements used in the Beijen patent are inserted into a rectangular compartment defined by side walls and two vertically spaced platens, and must be shaped to fit the compartment if the die is not to slide about horizontally during punching. A user of those die cutting machines might be able to locate a die produced by another manufacturer that provides the desired design, but would be unable to use it because the die does not fit correctly within the die cutter.

Craft punch users have also been able to avoid the tedious reassembly required to adapt other die cutters and punching apparatus to punch more than one outline. For example, the apparatus described in U.S. Pat. No. 173,732 to Matthews, U.S. Pat. No. 475,549 to Firnstein, U.S. Pat. No. 685,212 to Knowlton, and U.S. Pat. No. 1,491,464 to Coomer may be adapted to cut varying patterns in sheets or pictures. However, the cutting mechanisms used in each of these apparatus use two elements both of which have identical cutting contours which are pressed together to cut a sheet during use of the apparatus. Each element must be properly fit into the apparatus and aligned precisely for the apparatus to work correctly. Accordingly, the adaptation process required to adjust each apparatus for punching a new outline requires that the user detach both an upper and a lower element from the apparatus, select two new elements to replace the old elements, precisely align the new elements to each other, and fix the elements to the apparatus while preserving that alignment. Such complicated reassembly is laborious even for the sophisticated puncher, and must be done every time the user wishes to change the punch design. For some punchers, such as young children, the complex adaptation process may be beyond their abilities.

Consequently, craft punch users have benefitted from their ability to operate the punches independently from other equipment, both because they have not had to concern themselves with compatibility issues, and because they have not had to spend significant amounts of time readjusting equipment when switching from punching one shape to the next.

A great deal of the charm of punching for the craftsperson is that the craft punches can be used many times (unlike, for example, stickers). Punches are thus cost-effective tools for those who require design items in bulk. Unfortunately, the degree of pressure that a punch user must apply to compress the buttons of craft punches can quickly take a toll. Punching projects often require hundreds or even thousands of cutouts and punched sheets. After such an extended project, the operators of these punches often suffer from pain in their wrist, elbow, and shoulder joints, and may experience repetitive stress injuries and muscle strains or pulls.

The demographics of craft punch use indicate that a large percentage of the users of these punches are either elderly or very young. Children and the elderly, in particular, frequently find it difficult to exert the downward force needed to make punches operate. Those suffering from ailments such as arthritis may soon give up their punching efforts as too difficult and painful.

Furthermore, many craft punches begin to jam after extended use. Frequently, this increases the amount of force necessary to activate the punch to the point where use of the punch becomes nearly impossible. This often leads the user to give up on the punch and discard it.

Punches are especially susceptible to jamming if the force used to compress the punch button is not directly perpendicular to the punch's upper surface. When punching, many users cannot or do not consistently apply this perpendicular force to the punch button, and thereby increase the likelihood that the punch will jam. Additionally, users who try to apply force perpendicular to the punch button properly during every use are likely to strain or injure themselves, as the user must maintain a uniform posture of the hand and wrist for each punch, stressing the same points of the body with every punch.

It is an object of the current invention to provide a device which will assist a user in activating a punch using indirect force so that the punch may be used without stress or injury to the user.

Another object of the current invention is to provide a punch activating apparatus which is quickly and simply adaptable for compatibility with a wide variety of punches.

It is a further object of the current invention to provide an alignment guide to assist the punch user in accurate punching.

Other objects and advantages of the present invention will become apparent when the punch activating apparatus of the present invention is considered in conjunction with the accompanying drawings, specification, and claims.

SUMMARY OF THE INVENTION

A punch activating apparatus is provided which comprises a base assembly, a punch template, means for detachably securing the punch template to the upper surface of the base, and a lever assembly secured to the base assembly.

The base assembly includes a base having an upper surface, and the punch template has an aperture suitable for securing a punch therein. The lever assembly is operable to engage and compress an activating button of a punch secured in the aperture of the punch template when the punch template is secured to the upper surface of the base.

BRIEF DESCRIPTION OF THE DRAWINGS

FIG. 1 is a perspective view of a preferred embodiment of the inventive punch activating apparatus without a punch template.

FIG. 2 is a top plan view of the apparatus of FIG. 1 with the lever arm of the apparatus pivoted down, shown without the preferred alignment grid for clarity.

FIG. 3 is a top plan view of the apparatus of FIG. 1 with the lever arm of the apparatus pivoted up, showing the preferred alignment grid.

FIG. 4 is a top plan view of the apparatus of FIG. 1 with the lever arm of the apparatus pivoted up and a punch template secured atop the base of the apparatus.

FIG. 5 is a cross sectional view of the lever assembly taken at section line 5—5 of FIG. 2.

FIG. 6 is a cross sectional view of the lever arm and engagement plunger taken at section line 6—6 of FIG. 2.

FIG. 7 is a perspective view of a smaller embodiment of the inventive punch activating apparatus wherein the lever arm is raised FIG. 7A is a top plan view of a punch template which may be mounted upon the apparatus of FIG. 7.

FIG. 8 is a perspective view of the embodiment of the inventive apparatus of FIG. 7 wherein the lever arm has been lowered to activate the punch.

FIG. 9 is a cross-sectional view of the punch and inventive apparatus of FIG. 8 showing the insertion of a sheet into the punch, omitting the handle of the inventive apparatus for purposes of clarity of illustration.

DESCRIPTION OF THE PREFERRED EMBODIMENT

Referring to FIGS. 1–4, a preferred embodiment 10 of the inventive punch activating apparatus is shown. The inventive punch activating apparatus comprises a base assembly 12, a lever assembly 14 fixed to base assembly 12, and at least one punch template 16 (see FIG. 4) which is detachably securable to the base assembly 12.

Referring to FIG. 1, in preferred embodiment 10, base assembly 12 comprises a base 20, feet 22, a template mounting pin 24, an alignment strip 26, and an alignment grid 28. Base 20 forms a planar upper surface upon which a punch may be supported, and can be stably rested upon a supporting surface such as a table, the floor, or even a user's lap. Base 20 is constructed from a durable material and may be transparent, as shown in FIGS. 1–4, or opaque. Preferably base 20 is constructed from a plastic such as acrylic or polypropylene, but other suitable materials include, but are not limited to, plastics, metals, glass, wood, and stone. As the apparatus is intended to be suitable for use by children, preferably all the edges of the base are beveled and the corners of the base are rounded to remove sharp edges.

Feet 22 are affixed to the lower surface of base 20 to provide stability and to keep the base from sliding upon the supporting surface. A suitable material for the construction of feet 22 is rubber, which is durable and non-abrasive, but other materials may be used. Feet 22 are preferably attached to base 20 using an adhesive.

Referring to FIG. 4, when the inventive apparatus is in use, a punch template 16 (described in detail below) is used to hold a punch in place atop the base 20. In preferred embodiment 10, template mounting pin 24 and alignment strip 26 are provided to secure punch template 16 to the upper surface of the base 20. The template mounting pin 24 extends above the upper surface of base 20 such that an aperture 62 in the punch template 16 may be fitted over it. Alignment strip 26 is attached to the base along the edge of the base closest to template mounting pin 24, and provides a vertical upraised edge in relation to the upper surface of the base 20, such that when the punch template 16 is fitted over pin 24, an edge of the punch template 16 will engage the vertical upraised edge of alignment strip 26, preventing rotation of the punch template 16 about pin 24.

Template mounting pin 24 may be installed into base 20 by drilling an aperture having an identical or slightly smaller contour as the pin 24 into base 20 and press fitting pin 24 into the aperture. Alignment strip 26 may be attached to the upper surface of base 20 using an adhesive. However, it should be understood that template mounting pin 24 and alignment strip 26 may be attached to base 20 using any suitable means, or alternatively may be formed as integral parts of base 20.

In working embodiments of the inventive apparatus, a stainless steel pin has been used for template mounting pin 24, and alignment strip 26 has been formed from a gloss black acrylic plastic. However, any rigid and durable materials may be used to construct these items.

As is shown in FIGS. 1 and 3, in the preferred embodiment 10 an alignment grid 28 is marked on the base 20 such that the alignment grid 28 is visible from the upper surface of the base 20. When a punch is secured atop the inventive apparatus, alignment grid 28 allows the punch user to align a sheet inserted into the punch so that punching will take place at a selected spot on the sheet. The preferred alignment grid 28 shown partially in FIG. 1 and fully in FIG. 3 comprises a grid of vertical and horizontal lines, diagonal lines which can be used to align properly the corners of sheets inserted into corner punches, and a circled "target" area 29 (see FIG. 3) which indicates where the button of the craft punch should be centered when the inventive apparatus is used to activate the punch. Once the punch is secured in place atop base 20 with its button centered above the target area 29, a sheet may be inserted into the punch and oriented to a selected position by aligning the edges of the sheet, marked spots on the sheet, other punches made in the sheet, or the like, against the lines of alignment grid 28.

Alignment grid 28 may be applied to base 20 by silk-screening. Any color which is readily visible in contrast to base 20 may be used. Materials such as polypropylene used for base 20 may require fine sanding or other standard treatments to accept the silkscreening. Where base 20 is made from a transparent material, alignment grid 28 is preferably silkscreened upon the underside of base 20 but oriented for viewing from the planar upper surface of base 20. The placement of the alignment grid on the underside of base 20 lessens the likelihood that the silkscreening will eventually wear off, as presumably fewer items will be rested and moved about on the lower surface of base 20. Feet 22 raise the underside of base 20 from the supporting surface and accordingly further protect the underside of base 20. Where opaque materials are used to construct base 20, alignment grid 28 should be marked upon the planar upper surface of base 28 to be visible to the user of the inventive apparatus while the apparatus is utilized.

Referring to FIGS. 1 and 2, preferred lever assembly 14 comprises an arm bracket 30, a lever arm 32 pivotably fixed to arm bracket 30, an engagement plunger 34 pivotably fixed to lever arm 32, and a foam handle 36 secured over the non-fixed end of lever arm 32 for the comfort of the user. While arm bracket 30 and lever arm 32 may be made from any rigid and durable materials, anodized aluminum is preferred due to its strength, light weight, and reasonable cost. Engagement plunger 34 is preferably constructed from plastic.

Arm bracket 30 is secured to base assembly 12 and acts to anchor lever arm 32 to the base assembly 12. Where an alignment strip 26 is used, it is preferred that arm bracket 30 be positioned atop alignment strip 26, as shown in FIG. 1. Alternatively, arm bracket 30 may be secured directly atop base 20 (see FIG. 7).

Referring to FIG. 5, arm bracket 30 preferably has a T shape with two legs 38 extending laterally with relation to the upper surface of base 20. To secure arm bracket 30 to base assembly 12, screws 31 (shown in phantom) may be threaded through holes formed in base 20 and, assuming arm bracket 30 is positioned atop an alignment strip 26, through alignment strip 26, and into holes formed in the undersides of legs 38. It should be understood that other means for securing arm bracket 30 may be used, and indeed that the entire lever assembly 14 may be made detachable from base assembly 12 (i.e. for convenient storage and the like) as long as when secured they are held together with sufficient force that lever assembly 14 will not detach from base assembly 12 when lever assembly 14 is operated to apply pressure to a punch as described below. Where an alignment strip 26 is not used in base assembly 12, legs 38 of arm bracket 30 provide an alternative structure which may be used to prevent the rotation of a punch template 16 fitted on template mounting pin 24.

The vertically extending body 40 of the T-shaped arm bracket 30 forms two vertically upstanding forks 42 spaced apart by a groove. Lever arm 32 is formed in the shape of a T-channel having extending leg 44 (see FIG. 6). As shown in FIG. 5, lever arm 32 is pivotably fixed to arm bracket 30 using a pivot pin 46. The pivot pin 46 is press fit through apertures formed in forks 42, an aperture formed in leg 44 of lever arm 32, and two washers 48 fitted on either side of leg 44, as shown. Washers 48 prevent the arm bracket 30 and leg 44 of lever arm 32 from abrading each other when lever arm 32 is pivoted and ensure a snug fit of leg 44 in the groove between forks 42 such that there can be no significant horizontal movement of lever arm 32 within arm bracket 30. Washers 48 are preferably constructed from nylon or teflon, and pivot pin 46 is preferably constructed from stainless steel.

Referring to FIGS. 1 and 6, the engagement plunger 34 attached to lever arm 32 is designed to provide even pressure to the upper surface of the button on a punch when the lever assembly 14 is pushed downwardly during use of the inventive apparatus. As shown in FIG. 6, a channel is formed in the upper side of engagement plunger 34 so that it may be fitted about leg 44 of lever arm 32 and pivotably attached there by press fitting a pin 50 (preferably stainless steel) through a laterally extending hole formed in plunger 34 and through an aperture formed in leg 44 of lever arm 32. The position at which engagement plunger 34 is attached to lever arm 32 should be chosen to allow the engagement plunger 34 to descend to a height above the upper surface of the base 20 sufficient to depress the button of a punch resting below the engagement plunger 34 when lever arm 32 is pivoted toward base 20. Additionally, the engagement plunger 34 is preferably positioned as close to the fixed end of lever arm 32 as possible to optimize the torque provided by the lever assembly 14. Engagement plunger 34 has a planar lower surface 52 suitable for engaging the planar upper surface of a button on a punch.

A punch template 16 is shown fitted on base assembly 12 in FIG. 4. While the inventive apparatus may be used without a punch template 16 if the user holds the punch in place as the lever arm is brought down upon the punch, use of the punch templates 16 simplifies the punching process, lessens the risk of inadvertent movement of the punch during punching, frees the user's hand for maintaining the alignment of the sheet inserted into the punch, and prevents hands and fingers from becoming caught between the lever arm 32 and the punch.

Each punch template 16 forms one or more apertures 60 each of which has a contour chosen to match the contour of a commercially available punch or punches, such that a punch of that contour can be snugly fitted into that aperture 60. Each punch template 16 should be sufficiently thick such that the punch will not easily pop out of the aperture 60 once inserted therein, but sufficiently thin that the edges of each aperture 60 will not interfere with the insertion of a sheet into the punch assembly. Preferably, each punch template 16 has a thickness of approximately $\frac{1}{16}$ inches, which is slightly less than the thickness of the base of most standard punches.

Corresponding to each aperture 60 is a hole 62 sized and positioned such that the hole 62 may be fitted over template mounting pin 24 with the result that the corresponding aperture 60 is located beneath engagement plunger 34 and an edge of the punch template 16 engages the alignment strip 26 and/or arms 38 of arm bracket 30. Engaging the edge of the punch template ensures that the punch template 16 will not rotate about template mounting pin 24 when force is applied to the punch. The user thus may secure a punch atop base 20 using a simple three step process: choosing the template having the correct aperture 60 corresponding to the punch, fitting the appropriate hole 62 over template mounting pin 24, and placing the punch into the aperture 60. The punch templates may be made of any rigid and durable material, but are preferably made from a transparent or semi-transparent material such as clear acrylic plastic so that the alignment grid 28 may be seen clearly through the punch templates 16.

The punch templates 16 may be made having any number of apertures 60 and corresponding holes 62. Preferably the number of apertures 60 is maximized relative to the upper surface area of the punch template 16, and the punch template 16 is designed to cover but not extend past the edges of the upper surface of base 20 when the punch template 16 is centered on base 20.

Currently, by providing templates having apertures with sixteen different contours, users can secure most punches available on the market. Thus the punch user can take advantage of the punching aid provided by the inventive punch activating apparatus without having to restrict use to punches having a particular format or those made by a particular manufacturer, allowing the user to take advantage of his or her full library of punches. Even if new punches with radically different contours are developed, new templates can readily be provided corresponding to the new punch contours.

FIGS. 7, 7A, 8 and 9 show another embodiment 10' of the inventive punch activating apparatus in various stages of operation. FIGS. 7, 7A, 8 and 9 depict a smaller version of the inventive apparatus for illustrative purposes only; the embodiment of the inventive apparatus shown in FIGS. 1–6 is used identically, except that in the smaller embodiment, an aligning strip 26 is not used. Instead, the punch template is engaged by the arms 38 of the arm bracket 30.

Referring to FIG. 8, once a punch 70A has been selected, the user picks a punch template 16' (see FIG. 7A) having the appropriate aperture 60A into which to fit the punch 70A. Lifting lever arm 32 as shown in FIG. 7, the punch template 16' is then fitted atop base 20' by fitting the corresponding hole 62A over template mounting pin 24a. Alternatively, should the user have desired to use a different punch having a contour fitting into aperture 60B, the punch template 16' would be rotated about, and hole 62B would instead be fitted over template mounting pin 24a. Further, a second template mounting pin 24b may be provided to receive the other hole of the punch template 16'.

At this point, a sheet 72 may be fitted into punch 70A, as shown in cross section in FIG. 9. Sheet 72 may be made of any material which the punch 70A is capable of cutting, including, but not limited to, papers, foils, tapes, and fabrics. Sheet 72 is positioned between the base 74 and the body 76 of punch 70A for punching when activation button 78 is depressed. The user may utilize the alignment grid 28' (not shown in FIG. 8 for purposes of clarity of illustration) visible from the upper surface of the base 20' to align sheet 72 properly within the punch 70A.

Referring to FIG. 8, at this point, the user may push down the lever arm 32 to activate the punch 70A. Due to the positioning of aperture 60A in punch template 16', engagement plunger 34 directly engages activation button 78 of punch 70A once lever arm 32 is lowered. As force is exerted on the engagement plunger 34 by the button 78 when the lever arm 32 is pressed down, the engagement plunger 34 pivots to match the horizontal orientation of the button 78. This correctly aligns the plunger 34 with relation to the button 78 so that the force applied to the button 78 is directly perpendicular to the punch base. By consistently applying only properly oriented force to the punch button 78 and maintaining the perfect alignment of the plunger 34 to the punch button 78 during punching, the inventive device minimizes the risk of jamming working punches.

Once the button 78 has been fully depressed, the lever arm 32 may be raised and the sheet 72 removed or rapidly shifted for quick-succession punching. The current invention is particularly well suited for punching multiple cutouts in rapid succession. As most punches have sufficient internal capacity to store numerous cutouts before the cutouts must be removed for further punching, and as the punch is held in position by the punch template 16, 16' the user can quickly and easily produce neat stacks of cutouts within the punch.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the following claims.

It is claimed:

1. In combination, a punch and a punch activating apparatus, the punch having an activating button and being operable to cut a sheet inserted into an aperture of the punch when its activating button is depressed, the combination comprising:

a base assembly including a base having an upper surface;

a generally planar punch template removably disposed on the upper surface of the base and defining an aperture, the punch being removably received in the aperture of the punch template, wherein the punch template is located between a plane defined by the aperture of the punch and a plane defined by the upper surface of said base such that a sheet can be inserted into the aperture of the punch;

means for detachably securing the punch template to the upper surface of the base; and a lever assembly secured to the base assembly and operable to engage and depress the activating button of the punch when the punch is received in the aperture of the punch template and the punch template is secured to the upper surface of the base.

2. The combination of claim 1, wherein an alignment grid is marked on the base and is visible at the upper surface of the base.

3. The combination of claim 2, wherein the alignment grid is marked on the upper surface of the base.

4. The combination of claim 2, wherein the base is transparent and has a lower surface and the alignment grid is marked on the lower surface of the base.

5. The combination of claim 2, wherein the punch template is at least partially transparent.

6. The combination of claim 5, wherein the lever assembly comprises an arm bracket, a vertically pivotable lever arm pivotally fixed to the arm bracket, and a plunger which is pivotally fixed to the lever arm, the plunger engaging the activating button of the punch when the lever assembly is operated to engage and depress the activating button of the punch.

7. The combination of claim 6 wherein the means for detachably securing the punch template to the upper surface of the base comprises a hole in the punch template and a template mounting pin having an end extending vertically from the upper surface of the base and through the hole in the punch template, wherein the hole has a contour approximately equal to the contour of the mounting pin.

8. The combination of claim 7 wherein the punch template further defines at least one additional aperture suitable for securing a punch therein and, for each at least one additional aperture, the means for detachably securing the template to the upper surface of the base further comprises a hole corresponding to that additional aperture, each hole having a contour approximately equal to the contour of the mounting pin.

9. The combination of claim 8 wherein the base assembly further comprises an alignment strip fixed to one edge of the base, and wherein the arm bracket of the lever assembly is positioned atop the alignment strip and secured to both the base and the alignment strip.

* * * * *